(12) United States Patent
Smolic et al.

(10) Patent No.: US 8,711,204 B2
(45) Date of Patent: Apr. 29, 2014

(54) STEREOSCOPIC EDITING FOR VIDEO PRODUCTION, POST-PRODUCTION AND DISPLAY ADAPTATION

(75) Inventors: Aljosa Aleksej Andrej Smolic, Zurich (CH); Oliver Wang, Los Angeles, CA (US); Manuel Lang, Zurich (CH); Alexander Hornung, Zurich (CH); Markus Gross, Uster (CH); Wojciech Matusik, Lexington, MA (US)

(73) Assignee: Disney Enterprises, Inc., Burbank, CA (US)

(*) Notice: Subject to any disclaimer, the term of this patent is extended or adjusted under 35 U.S.C. 154(b) by 561 days.

(21) Appl. No.: 12/766,734

(22) Filed: Apr. 23, 2010

(65) Prior Publication Data

US 2011/0109720 A1 May 12, 2011

Related U.S. Application Data

(60) Provisional application No. 61/296,425, filed on Jan. 19, 2010, provisional application No. 61/260,274, filed on Nov. 11, 2009.

(51) Int. Cl.
*H04N 9/093* (2006.01)
*H04N 13/04* (2006.01)

(52) U.S. Cl.
USPC .................. 348/43; 348/42; 348/51

(58) Field of Classification Search
None
See application file for complete search history.

(56) References Cited

U.S. PATENT DOCUMENTS

| | | | |
|---|---|---|---|
| 6,031,538 A * | 2/2000 | Chupeau et al. | 345/419 |
| 6,956,566 B2 * | 10/2005 | Gelb | 345/419 |
| RE39,342 E | 10/2006 | Starks et al. | |
| 7,991,228 B2 * | 8/2011 | Blake et al. | 382/173 |
| 8,228,327 B2 * | 7/2012 | Hendrickson et al. | 345/420 |
| 8,300,089 B2 * | 10/2012 | Robinson | 348/47 |
| 2005/0190180 A1 | 9/2005 | Jin et al. | |
| 2006/0066612 A1 * | 3/2006 | Yang et al. | 345/419 |
| 2007/0165942 A1 * | 7/2007 | Jin et al. | 382/154 |
| 2008/0303893 A1 * | 12/2008 | Kim et al. | 348/42 |
| 2009/0096863 A1 * | 4/2009 | Kim et al. | 348/42 |
| 2009/0141022 A1 * | 6/2009 | Kimpe | 345/419 |

(Continued)

FOREIGN PATENT DOCUMENTS

WO 2008139351 A1 11/2008

OTHER PUBLICATIONS

Kadir, Timor and Brady, Michael. "Saliency, Scale and Image Description". Nov. 2000. Univ. of Oxford.*

(Continued)

*Primary Examiner* — Sath V Perungavoor
*Assistant Examiner* — Matthew J Anderson
(74) *Attorney, Agent, or Firm* — Patterson & Sheridan, LLP

(57) ABSTRACT

Systems, methods and articles of manufacture are disclosed for stereoscopically editing video content. In one embodiment, image pairs of a sequence may be stereoscopically modified by altering at least one image of the image pair. The at least one image may be altered using at least one mapping function. The at least one image may also be altered based on a saliency of the image pair. The at least one image may also be altered based on disparities between the image pair. Advantageously, stereoscopic properties of video content may be edited more conveniently and efficiently.

36 Claims, 13 Drawing Sheets

(56) References Cited

U.S. PATENT DOCUMENTS

| | | | |
|---|---|---|---|
| 2009/0195640 A1* | 8/2009 | Kim et al. | 348/43 |
| 2010/0039428 A1* | 2/2010 | Kim et al. | 345/419 |
| 2010/0091093 A1* | 4/2010 | Robinson | 348/47 |
| 2010/0302234 A1* | 12/2010 | Kao et al. | 345/419 |
| 2011/0001792 A1* | 1/2011 | Pandit et al. | 348/43 |
| 2011/0032338 A1* | 2/2011 | Raveendran et al. | 348/51 |
| 2011/0199465 A1* | 8/2011 | Barenbrug et al. | 348/54 |

OTHER PUBLICATIONS

Krishnamurthy et al. "Compression and transmission of depth maps for image-based rendering" 2001 International Conference on Image Processing. (Oct. 2001). Proceedings. vol. 3, p. 828-831.*

New Zealand Examination Report dated Nov. 18, 2010.

Redert et al.; "Visualization of arbitrary-shaped 3D scenes on depth-limited 3D displays", USA, IEEE, Sep. 6, 2004, pp. 938-942 <10.1109/TDPVT.2004.1335416>.

* cited by examiner

STEREOSCOPIC EDITING FOR VIDEO PRODUCTION, POST-PRODUCTION AND DISPLAY ADAPTATION

CROSS-REFERENCE TO RELATED APPLICATIONS

This application claims benefit of U.S. provisional patent application Ser. No. 61/296,425, filed on Jan. 19, 2010, and U.S. provisional patent application Ser. No. 61/260,274, filed on Nov. 11, 2009.

BACKGROUND

1. Field of the Invention

The present invention relates to the field of video processing and, in particular, to stereoscopic editing of video content.

2. Description of the Related Art

Human beings typically see using stereoscopic vision. The left and right eyes of an observer each perceives slightly different views of a scene, and the brain of the observer fuses the slightly different views into a single image that provides depth information. The depth information allows the observer to perceive the relative distance to various objects in the scene. Movies filmed with a single camera may not provide such depth information to the viewer and thus tend to look flat.

Early efforts in 3-D movie technology used anaglyphs, in which two images of the same scene, with a relative offset between them, are superimposed on a single piece of movie film, with the images being subject to complimentary color filters (e.g., red and green). Viewers donned special glasses so that one image would be seen only by the left eye while the other would be seen only by the right eye. When the brains of the viewers fused the two images, the result was the illusion of depth. In the 1950s, "dual-strip" projection techniques were widely used to show 3-D movies. Using dual-strip projection techniques, two films were projected side-by-side in synchronism, with the light from each projector being oppositely polarized. Viewers wore polarizing glasses, and each eye would see only one of the two images. More recently, active polarization has been used to distinguish left-eye and right-eye images. Left-eye and right-eye images are projected sequentially using an active direction-flipping circular polarizer that applies opposite circular polarization to the left-eye and right-eye frames. The viewer dons glasses with opposite fixed circular polarizers for each eye, so that each eye sees only the intended frames. Various other systems for projecting 3-D movies have also been used over the years.

The trend towards 3-D movies in theatres and in home entertainment systems has been growing. The 3-D movies may be produced using stereoscopic techniques. Stereoscopic techniques create an illusion of depth from a pair of 2-D images, each of which is presented to a separate eye of a viewer. The pair of 2-D images may represent two slightly different perspectives of a scene. The slightly different perspectives may resemble the natural, binocular vision of the eyes of the viewer. By presenting 2-D images of slightly different perspectives to the right eye and to the left eye of the viewer, respectively, the viewer may perceive a three dimensional composite of the 2-D images, in which certain objects of the scene appear nearer to the viewer than other objects of the scene. That is, the brain of the viewer may merge or fuse the left and right eye images to create a perception of depth.

The degree of offset of objects in the image pair determines the depth at which the objects are perceived by the viewer. An object may appear to protrude toward the viewer and away from the neutral plane or screen when the position or coordinates of the left eye image are crossed with the position or coordinates of the right eye image (e.g., negative parallax). In contrast, an object may appear to recede or be behind the screen when the position or coordinates of the left eye image and of the right image are not crossed (e.g., positive parallax).

It is increasingly common for movies to be filmed (in the case of live action movies) or imaged (in the case of rendered animations) in stereo for 3-D viewing. Image frames used to produce stereoscopic video (or stereo video) may be referred to as stereoscopic images. An image frame (or simply, frame) refers to an image at a specific point in time. An illusion of motion may be achieved by presenting multiple frames per second (fps) to the viewer, such as twenty-four to thirty fps. A frame may include content from a live action movie filmed with two or more cameras. A frame may also include content from a rendered animation that is imaged using two camera locations. In stereo video, stereoscopic perception results from the presenting a left eye image stream and a right eye image stream to the viewer.

SUMMARY

One embodiment of the invention provides a method that includes providing at least one video frame, each video frame including at least two stereo images. The method may also include stereoscopically modifying a video frame by altering at least one stereo image of the video frame using at least one mapping function.

Another embodiment of the invention provides a computer-readable storage medium containing a program which, when executed, performs an operation that includes providing at least one video frame, each video frame including at least two stereo images. The operation may also include stereoscopically modifying a video frame by altering at least one stereo image of the video frame using at least one mapping function.

Still another embodiment of the invention provides a system including a computer processor and a memory containing a program which, when executed by the computer processor, is configured to perform an operation that includes providing at least one video frame, each video frame including at least two stereo images. The operation may also include stereoscopically modifying a video frame by altering at least one stereo image of the video frame using at least one mapping function.

Yet another embodiment of the invention provides a method that includes providing at least one video frame, each video frame including at least two stereo images. The method may also include stereoscopically modifying a video frame by altering at least one of the stereo images of the video frame based on at least one predefined aspect of disparity.

Another embodiment of the invention provides a method that includes providing at least one video frame, each video frame including at least two stereo images. The method may also include stereoscopically modifying a video frame by altering at least one of the stereo images of the video frame using at least one predefined disparity mapping operator.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Figure 1A:
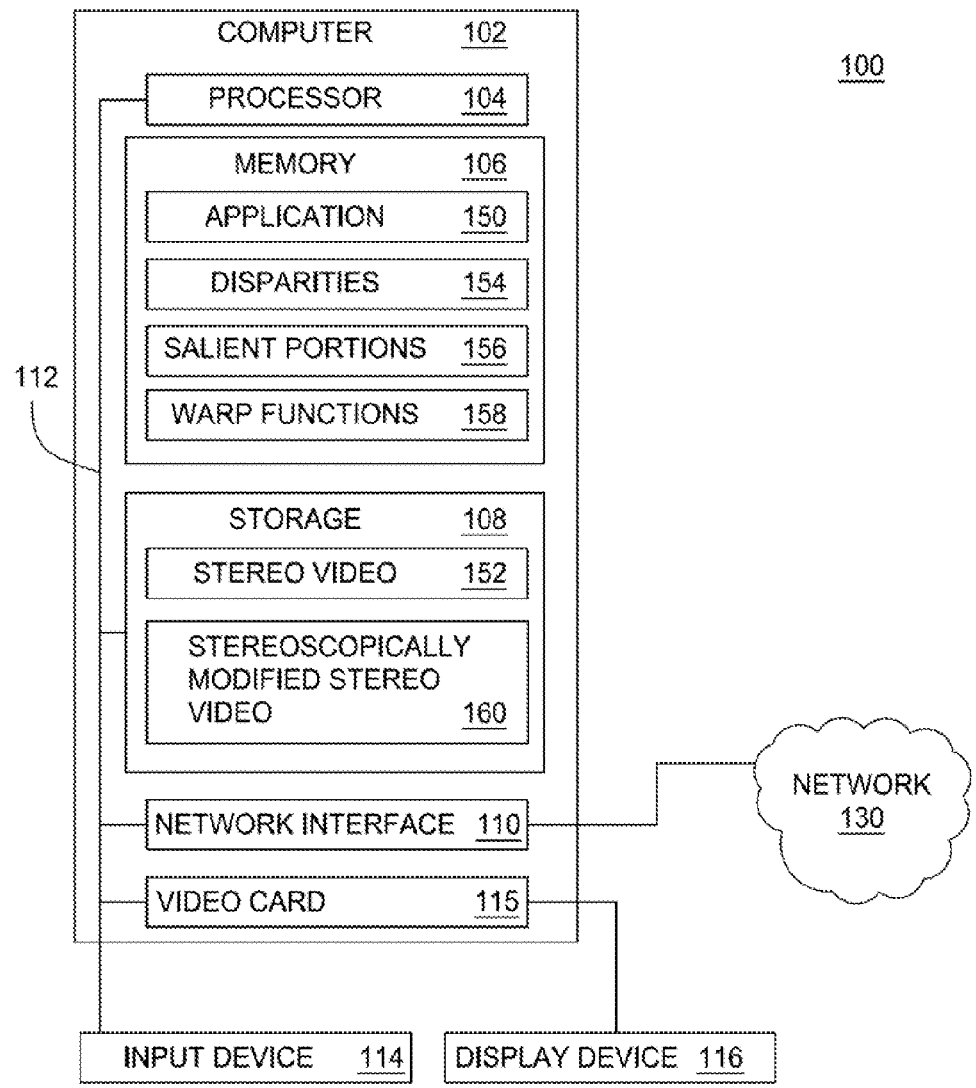
FIG. 1A is a block diagram illustrating a system for stereoscopically modifying a sequence of image pairs, according to one embodiment of the invention.

Embodiments of the invention provide techniques for stereoscopic editing for video production and post-production (e.g., stereoscopic baseline adaptation and operators for disparity mapping). One embodiment of the invention provides an application for stereoscopically modifying a sequence of image pairs. Specifically, the application may modify a stereoscopic property of each image pair. The application may alter at least one image of each image pair using mapping functions (e.g., non-linear warp functions). The application may compute the mapping functions based on a saliency of the respective image pair and/or based on a sparse set of disparities between the images of the respective image pair. The mapping function may be linear, non-linear, or discontinuous functions in the form of warps or other mapping types (e.g., seam carving). The mapping functions may also be computed based on user input. The resulting image pair may have a modified stereoscopic property. For example, the resulting image pair may have a modified interocular distance and/or a modified local depth composition of depicted objects. Advantageously, a content producer may more conveniently and efficiently modify stereoscopic properties of a video. For example, stereoscopic properties of a stereo video may be modified in a post-production environment, thereby avoiding having to re-film or re-render the video using new camera configurations. A costly manual editing of video frames may also be avoided. Further, the content producer may modify stereoscopic properties of the video without requiring perfect depth information, without introducing hole-filling artifacts, and without introducing parallax errors. As used herein, parallax refers to an apparent displacement or difference of orientation of an object viewed along two different lines of sight.

In one embodiment, a video may be stereoscopically modified to correct displacements of objects between the left and right eye. For instance, large displacements of objects and/or dominant depth cues in a scene may be uncomfortable for the viewer and may even induce sickness. Accordingly, a content producer may desire to limit parallax of a video to acceptable ranges to improve viewing comfort of the viewer. Parallax refers to an apparent displacement or difference of orientation of an object viewed along two different lines of sight.

Further, a stereo movie produced for a particular medium, such as cinema, often cannot be played back on a different medium such as a TV or mobile device, because the parallax of the stereo video is inappropriate for the different medium. In one embodiment, the application may modify a scene depth and/or parallax of the stereo video such that the stereo video becomes suited for the different medium (such as the TV or the mobile device). For example, artistic intention and viewing comfort may be preserved. Advantageously, the content producer may create a stereo video for one particular platform and correct the stereo video to other desired platforms in a post-production environment. Consequently, the content producer avoids having to re-film or re-render the video using new camera configurations specific to each other desired platform.

Once stereo footage is recorded, it may no longer be possible to alter certain parameters such as stereoscopic baseline or disparity range. While image-based view interpolation may be employed, image-based view interpolation may require either a very large number of densely sampled input images or additional accurate depth maps to achieve results of acceptable quality. Further, image-based view interpolation typically involves under-constrained and computationally complex operations such as accurate depth, camera calibration, and inpainting of occluded scene content. Alternatively, manual editing may also be employed. However, manual editing of disparities—e.g., by compositing content from multiple stereo videos of varying baseline—may be labor intensive and extremely costly. Further, manual editing may not be feasible for live broadcast environments (e.g., where the disparity range is modified in real-time).

In one embodiment, the application may stereoscopically edit a stereo video based on predefined aspects of disparity. The application may implement disparity mapping operators based on the predefined aspects of disparity and using non-linear functions (e.g., stereoscopic image warping). Advantageously, the application may stereoscopically edit the stereo video using sparse set of stereo correspondences. The application may also be compatible with manual disparity authoring. Thus, the application may be integrated into existing production workflows that entail manual disparity authoring. Consequently, a user (such as a content producer) may stereoscopically edit the stereo video without requiring camera recalibration, accurate dense stereo reconstruction, or inpainting.

As used herein, the term "movie" refers to any sequence of images that, when viewed in succession, produce the effect of viewing a moving image. The images may be live-action, computer-generated, or a mix of live-action and computer-generated elements. The sequence may have any length desired (e.g., two minutes to two or more hours). The images may be captured and/or displayed using analog or digital media or a combination thereof (for example, a computer-generated image printed onto movie film). A "shot" refers to a subset of a movie during which camera parameters are either held constant or smoothly varied. A movie may include any number of shots. A "scene" refers to a subset of a movie that relates a continuous (e.g., in time and place) sequence of events. A scene may be composed of multiple shots.

In one embodiment, the application modifies a video to change perceived depth within a scene depicted in the video. The application may use a saliency map to limit distortions of important areas or objects in the scene. The application may also apply a content-preserving image warp to selectively warp certain pixels of the video frames. The application may use sparse disparity information (which may be computed from the video) instead of requiring a depth map. For example, the user may provide a sparse set of depth cues to the application via interactive scribbling and/or sketching. Advantageously, a content producer can simplify the process of generate 3D video from 2D video. For example, a 3D cartoon may be generated from a 2D cartoon (that lacks 3D geometry from which depth information may be obtained) by defining a disparity field and using the application to generate a stereo image pair from a single image. For instance, the application may make a copy of the single image and then modify a stereoscopic property of the single image and/or of the copy, to form a stereo image pair from the single image.

As described above, in one embodiment, the application may modify an interocular distance of an image pair and/or a local depth composition of objects depicted in the image pair. In one embodiment, the application may be used during stereo video production. For example, the application may be integrated into a stereo camera system to correct mistakes in captured footage, such as a live sports broadcast. The application may also be used in stereo video postproduction to correct mistakes and to modify depth as desired (e.g., to achieve desired visual effects). For example, content creators may use the application to create artistic depth in stereo videos, such as stereo live action movies. Further, the application may also be used in a home entertainment system to dynamically alter a stereo video to suit viewing characteristics specific to the home entertainment system (e.g., display size, resolution, viewing distance, etc.). Advantageously, artistic intention and viewing comfort may be preserved regardless of the viewing characteristics of a particular home entertainment system.

In one embodiment, the application warps a pair of stereo images to alter the perceived depth and parallax of the pair of the stereo images. The application may detect corresponding feature points and compute the stereo disparity between the stereo images. As used herein, stereo disparity refers to the displacement between corresponding features of a stereo image pair. A disparity field over a pair of stereo images specifies such feature correspondences between the stereo images. The disparity field may also include disparity constraints. The disparity constraints may be specific to a feature, object, character, scene, etc. The disparity constraints may be specified from a user or determined by the application. For example, the disparity constraints may specify a maximum disparity for a specific object in a scene depicted in the image pair. The disparity constraints may also specify a linear scaling of the complete range of disparities.

In one embodiment, the application warps one or both of the stereo images to correspond to the disparity field. In one embodiment, the warp is locally adaptive. That is, the warp may preserve an exact shape of salient regions of an image while hiding deformations in less salient regions of the image. The resulting image pair generated by the application includes the same image content as the original image pair, but at a differently perceived scene depth.

In one embodiment, a content producer using the application may apply an arbitrary mapping function (e.g., disparity operators, which are further described below) to the range of disparities (i.e., depth values) of a video. Applying the arbitrary mapping function to the range of disparities may also be referred to herein as a "warp" of the disparity range (to transform depth)—not to be confused with a warp of a stereo image pair (to deform one or more images of the stereo image pair). However, applying the arbitrary mapping function to the range of disparities of an image sequence may be implemented by warping the images. That is, the images may be deformed in order to realize/implement the mapping function (e.g., disparity operators) applied to the disparity range. "Warping" the disparity range (as opposed to deforming the actual images) may be illustrated by the following examples. A vast-scene depth of landscapes can be combined with normal scene depth for characters to achieve artistic effects. In real-time stereo sports broadcasting such as football, it may be distracting to a viewer if nearby audience and distant players on the field are shown in close proximity to one another in a scene. The content producer may use the application to adjust the disparity of the nearby audience to achieve a more comfortable viewing experience.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1A is a block diagram illustrating a system 100 for stereoscopically modifying a sequence of image pairs, according to one embodiment of the invention. The networked system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a video card 115, a storage 108, an input device 114, and a display device 116. The computer 102 is generally under the control of an operating system. Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The display device 116 may operate in conjunction with the video card 115 to provide output to a user of the computer 102. Although shown separately from the input device 114, the display device 116 and input device 114 may be combined. For example, a display screen with an integrated touch-screen or a display with an integrated keyboard may be used.

In one embodiment, the video card 115 incorporates circuitry that is optimized for graphics and video processing and that constitutes a graphics processing unit (GPU). In another embodiment, the video card 115 incorporates circuitry optimized for general purpose processing. In yet another embodiment, the video card 115 may be integrated with one or more other system elements, such as the processor 104, to form a system on chip (SoC). In still further embodiments, the video card 115 is omitted and software executed by processor 104 performs the functions of the video card 115.

Pixel data can be provided to video card 115 directly from processor 104. In some embodiments of the present invention, instructions and/or data representing a scene are provided to a render farm or a set of server computers, each similar to the system 100, via the network interface device 110 or the storage 108. The render farm generates one or more rendered images of the scene using the provided instructions and/or data. These rendered images may be stored on computer-readable media in a digital format and optionally returned to the system 100 for display. Similarly, images processed by video card 115 may be output to other systems for display, stored in the storage 108, or stored on computer-readable media in a digital format.

Alternatively, the processor 104 provides the video card 115 with data and/or instructions defining the desired output images, from which the video card 115 generates the pixel data of one or more output images. The data and/or instructions defining the desired output images can be stored in the memory 106 or graphics memory within the video card 115. In an embodiment, the video card 115 includes 3D rendering capabilities for generating pixel data for output images from instructions and data defining the geometry, lighting shading, texturing, motion, and/or camera parameters for a scene. The video card 115 can further include one or more programmable execution units capable of executing shader programs, tone mapping programs, and the like.

Communication paths interconnecting the various components in FIG. 1A may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, the memory 106 of the computer 102 includes the application 150 for stereoscopically modifying a sequence of image pairs, disparities 154 between an image pair, salient portions 156 of an image pair, and warp functions 158. The storage 108 of the computer 102 includes a stereo video 152 and a stereoscopically modified stereo video 160.

In one embodiment, the application 150 receives the stereo video 152. The application may analyze the stereo video 152 to determine disparities 154 and salient portions 156. The application 150 may compute warp functions 158 for each frame of the stereo video 152 and from the disparities 154 and the salient portions 156. The application 150 may apply the warp functions 158 to each frame of the stereo video 152 to generate the stereoscopically modified stereo video 160. For example, the stereoscopically modified stereo video 160 may include a modified interocular distance and/or a modified local depth composition of a depicted scene. Advantageously, a content producer may use the application 150 to more conveniently and efficiently modify stereoscopic properties of the stereo video 152.

In one embodiment, the application 150 may stereoscopically edit the stereo video 152 based on predefined aspects of disparity. In one embodiment, the predefined aspects of disparity may include disparity range, disparity sensitivity, disparity gradient, and disparity velocity. Each of these predefined aspects is further discussed below. Of course, those skilled in the art will appreciate that these predefined aspects are not intended to be limiting of the disclosure, and other aspects of disparity are broadly contemplated. In one embodiment, the application 150 may stereoscopically edit the stereo video 152 based only on the disparity range, disparity sensitivity, disparity gradient, and disparity velocity.

In one embodiment, the disparity range specifies an area (or volume) that permits proper stereo video and depth perception. The disparity range may include panum's area, which specifies a zone surrounding a horopter where retinal images are fused into a single object. The horopter may be a curved line which represents points that are at the same distance from the observer as an object of focus. That is, the disparity range for a displayed scene may correspond to a stereoscopic comfort zone of a viewer.

Figure 1B:
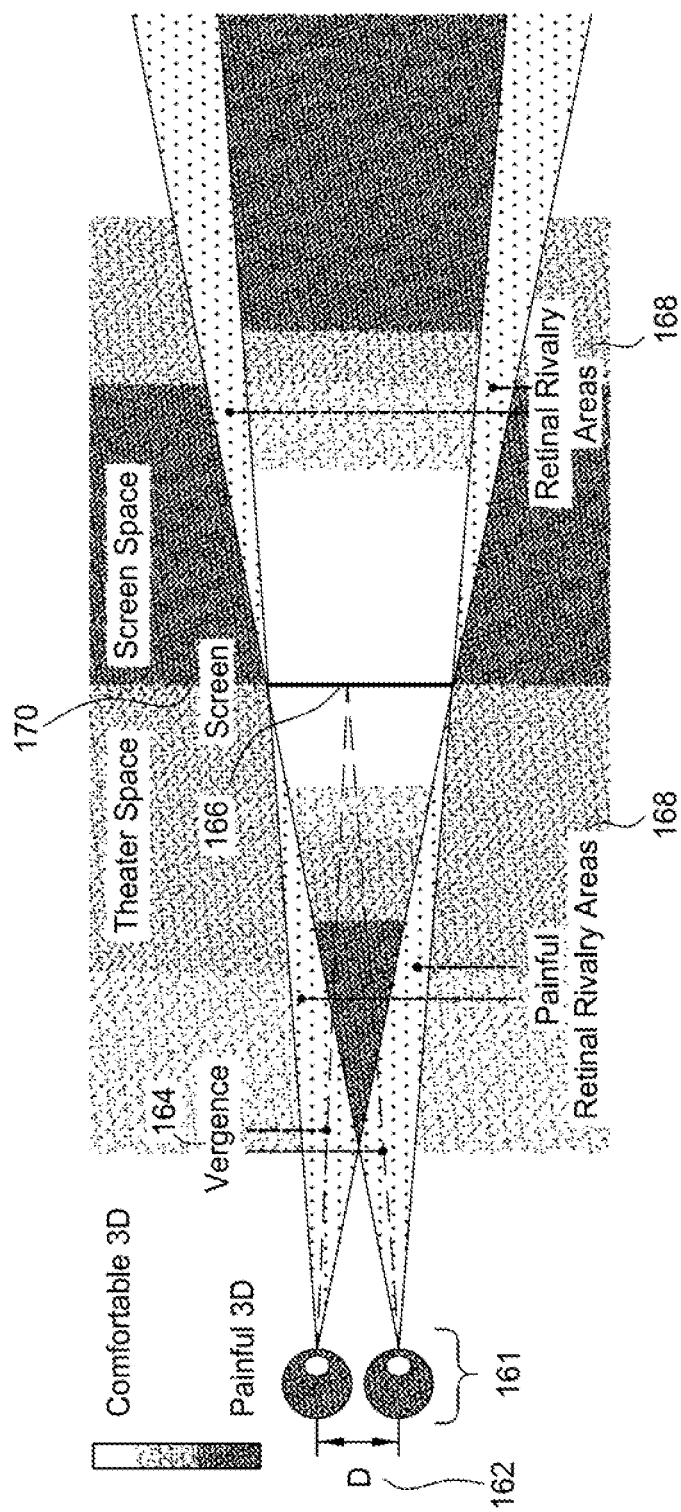
FIG. 1B illustrates a stereoscopic comfort zone of a viewer, according to one embodiment of the invention.

FIG. 1B illustrates the stereoscopic comfort zone of the viewer, according to one embodiment of the invention. The disparity range for a displayed scene may depend on one or more parameters. For example, the disparity range may be a function of an interocular distance 162, the vergence 164 of the eyes 161 of the viewer, and the distance to a point of interest 166 (e.g., on a screen 170). As used herein, the vergence 164 of the eyes refers to an inward or outward turning of one or both eyes that occurs when focusing on an object. When focusing on a nearby object, the viewer may be unable to fuse images of other objects in the distant background due to excessive disparity. That is, the viewer may see double images of the other objects in the distant background.

Stereoscopic techniques often present a 3D scene as an image pair on a flat screen surface. While providing disparity, such techniques may be unable to reproduce other depth cues, such as accommodation. The lack of accommodation and the restriction of the disparity range may make it difficult for the viewer to properly view the 3D scene. For example, the viewer may perceive distortions of the 3D scene. The viewer may also experience visual fatigue. Difficulty in properly viewing the 3D scene also arises for displays of different characteristics and for people having different visual attributes. For example, approximately one-third of the population has deficiencies that reduce a size of an overall volume that may be perceived in stereo video.

In some cases, linear mapping techniques may be used to change a disparity range to a desired range. Such techniques introduce a linear distortion of the disparity space of a scene. The introduced linear distortion of the disparity space corresponds to a uniform flattening of objects in the scene. On a 30-foot cinema screen that displays a video having a width of 2048 pixels, disparity values may include +30 pixels (for objects appearing behind the screen) and −100 pixels (for objects appearing in front of the screen). A user may modify the camera baseline during filming or modify a relative positioning of the left and right views after filming to adjust the disparity offset. Objects in areas 168 of retinal rivalry—e.g., floating in front of the screen and intersecting with image borders—may cause the viewer to experience retinal rivalry.

Retinal rivalry refers to eyes of the viewer being simultaneously or successively stimulated on corresponding retinal areas by dissimilar images (e.g. a green source to one eye and a red to the other eye, or a set of vertical lines to one eye and a set of horizontal lines to the other eye), upon which the viewer experiences a phenomenon of visual perception in which perception alternates between the dissimilar images presented to each eye. In post-production, a floating window technique may be employed to adjust the recorded footage. The floating window technique performs a virtual shift of the screen plane towards the viewer. However, because the camera baseline of the recorded footage may not be easily modified, such techniques may involve manual, expensive, cumbersome per-frame editing.

In one embodiment, the disparity sensitivity—which may refer to the ability of the viewer to discriminate different depths—may decrease with increasing viewing distance. More specifically, stereoacuity may be inversely proportional to a square of the viewing distance. In other words, the depth perception of the viewer may generally be more sensitive an accurate with respect to nearby objects. For distance objects, the viewer may rely more heavily on other depth cues, such as occlusion or motion parallax.

In one embodiment, the decreased sensitivity to larger depths may be used to apply non-linear remapping. Consequently, foreground objects may be (perceived by the viewer as being) flattened to a less extent than when using linear range adaptation. Applying non-linear remapping may correspond to a compressing the depth space at larger distances. Further, composite non-linear mapping may be used, in which the disparity range of individual objects is stretched, while spaces between the objects are compressed. While such techniques may be effective in areas such as media retargeting, the techniques may be difficult to apply to stereoscopic live action footage because doing so may require adaptively modifying the camera baseline. However, multi-rigging may be used to capture a scene with camera rigs of varying baseline. Stereo footage may then be manually composed during post-production based on the captured scenes from the camera rigs of varying baseline.

In one embodiment, the visual perception of the viewer may be limited in terms of the disparity gradient. The disparity gradient may be defined as a difference in disparities (of an object/feature of a scene) divided by an angular separation (of the object/feature). The perception of different depth gradients may depend on local scene content, spatial relationships between objects, etc. As a result, the viewer may experience distorted perception of a 3D structure of the scene. Further, the viewer may be unable to properly view stereoscopic video. In one embodiment, the application 150 may stereoscopically edit the stereo video to confine displayed gradients within perceptual limits of the viewer. Further, a user (e.g., a content producer) may edit the disparity gradient of the stereo video to redesign the depth structure of a scene on a per-object basis to achieve desired artistic effects and/or objectives.

A viewer may rapidly perceive and process stereoscopic information for real world scenes that do not have conflicting stereo cues. However, when the stereoscopic information includes conflicting or ambiguous stereo cues, such as inconsistent vergence and accommodation, the time for the viewer to process the stereoscopic information may increase considerably. In one embodiment, disparity velocity refers to this temporal aspect of disparity. The viewer may be accustomed to disparities varying smoothly over time, such as in the real world. However, stereoscopic movies may include transitions and scene cuts. The transitions and scene cuts may include discontinuities in disparity that are perceptually uncomfortable for the viewer and may result in a duration in which the viewer is unable to perceive depth. The content producer may use a continuous modification and adaption of the depth range at scene cuts to provide smooth disparity velocities—i.e., so that salient scene elements are at similar depths over the transition. Further, a content producer may exploit depth discontinuities as a storytelling element and/or a visual effect (e.g., to evoke an emotional response from the viewer).

As described above, the application 150 edits the stereo video 152 stereoscopically based on aspects of disparity such as disparity range, disparity sensitivity, disparity gradient, and disparity velocity. The application 150 may perform the editing using disparity mapping operators. For a digital stereo image pair $(I_l, I_r)$ let $x \in \Re^2$ be a pixel position in the left image $I_l$. The disparity $d(x) \in \Re^2$ may be defined as a distance (measured in pixels) to a corresponding pixel in $I_r$ (and vice versa). The range of disparities between the two images is an interval $\Omega = [d_{min}, d_{max}] \subset \Re^2$. The disparity mapping operators may be defined as functions $\phi: \Omega \to \Omega'$ that map an original range $\Omega$ to a new (target) range $\Omega'$.

In one embodiment, the application 150 may edit a disparity range of the stereo video 152 using a disparity operator that performs a linear mapping of the global range of disparities of the stereo video. The disparity operator may be used to perform a linear mapping of the global range of disparities (e.g., for display adaptation). A globally linear adaptation of a disparity $d \in \Omega$ to the target range $\Omega' = [d'_{min}, d'_{max}]$ may be obtained via a mapping function:

$$\phi_l(d) = \frac{d'_{max} - d'_{min}}{d_{max} - d_{min}}(d - d_{min}) + d'_{min}. \quad \text{(Equation 1)}$$

By changing the interval width of the target range $\Omega'$, the depth range can be scaled and offset to match an overall available depth budget of the comfort zone.

In one embodiment, the application 150 may edit a disparity sensitivity of the stereo video 152 using a disparity operator that performs global nonlinear disparity compression. The disparity operator may be used to perform nonlinear mapping for globally or locally adaptive depth compression and expansion. The global nonlinear disparity compression may be achieved by any nonlinear function such as:

$$\phi_n(d) = \log(1 + sd) \quad \text{(Equation 2)}$$

with a scale factor s. For more complex, locally adaptive nonlinear editing, the overall mapping function can be composed from basic operators. For example, given a set of different target ranges $\Omega_1, \ldots, \Omega_n$ and corresponding functions $\phi_1, \ldots, \phi_n$, the target operator may be:

$$\phi(d) = \begin{cases} \phi_0(d), & d \in \Omega_0 \\ \cdots & \cdots \\ \phi_n(d), & d \in \Omega_n \end{cases} \quad \text{(Equation 3)}$$

Figure 5:
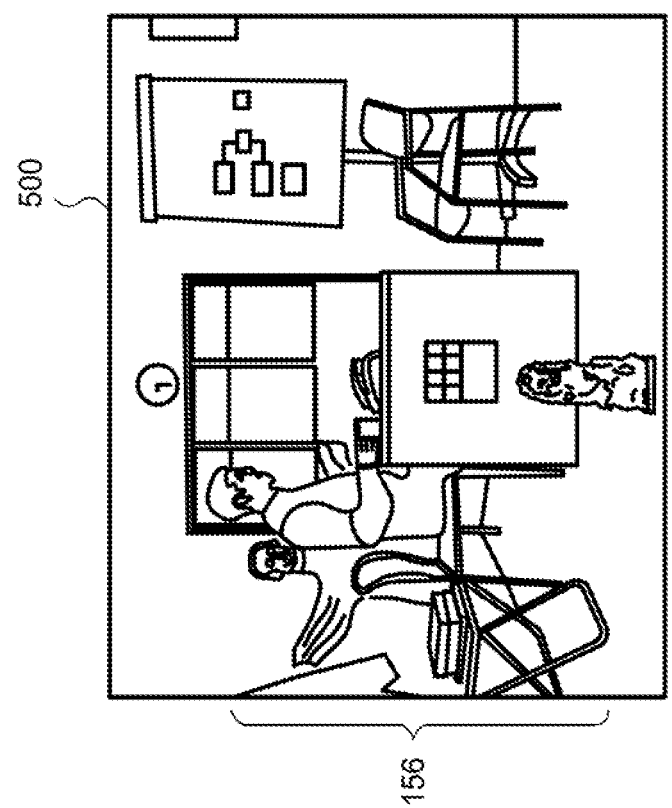
FIG. 5 illustrates salient portions of an image as determined by the application, according to one embodiment of the invention.
Figure 6:
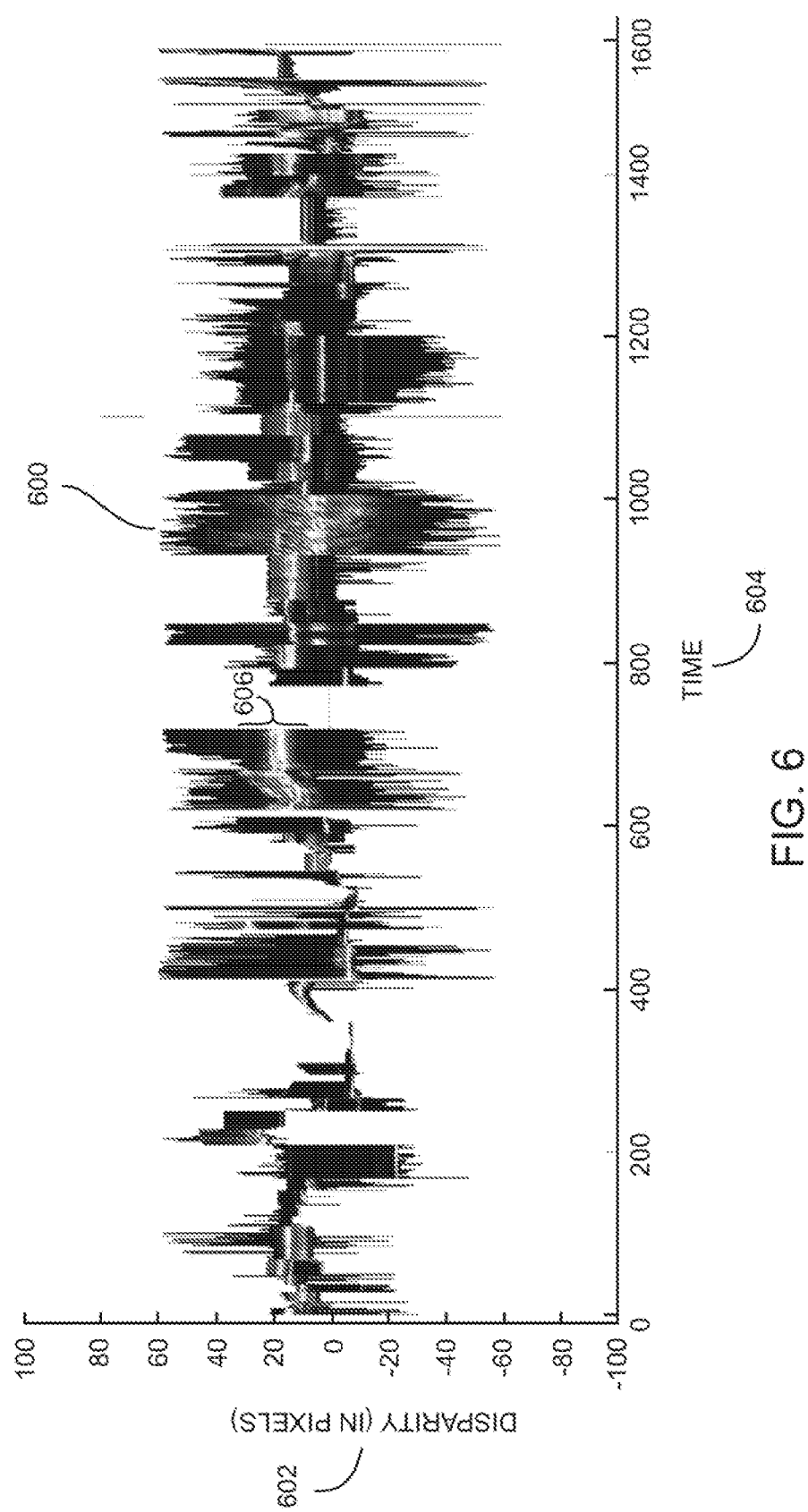
FIG. 6 illustrates a graph representing a disparity storyboard of a stereo movie trailer, according to one embodiment of the invention.

One approach to generate such complex nonlinear functions in a depth authoring system may be to use a histogram of disparity values (as shown in FIG. 6, which is further described below) for identifying dominant depth regions and/or to analyze the visual saliency of scene content in image space. Saliency maps (as shown in FIG. 5, which is further described below) $S(x) \in [0,1]$ may be used to represent the level of visual importance of each pixel and can be generated by the application 150 or manually specified by a user. From the saliency map, the application 150 may determine which disparity ranges $\Omega_i$ are occupied by objects that are more important and which regions are less important. From these determined measures of importance—which correspond to the first derivative $\phi'_a$—the application 150 may generate a disparity operator as the integral:

$$\phi_a(d) = \int_0^d \phi'_a(x)\,dx. \quad \text{(Equation 4)}$$

In one embodiment, the application 150 may edit a disparity gradient of the stereo video 152 using a gradient domain operator. The gradient domain operator may be used to perform disparity remapping by modifying disparity gradients. The gradient domain operator may be defined based on saliency maps $S(x)$ as functions $\phi_\nabla(\nabla d(x), S(x))$. For example, the gradient domain operator may perform adaptive compression using interpolation between a linear map and a nonlinear map $\phi_l$ and $\phi_n$, according to:

$$\phi_\nabla(\nabla d(x), S(x)) = S(x)\phi_l(\nabla d(x)) + (1 - S(x))\phi_n(\nabla d(x)). \quad \text{(Equation 5)}$$

The application 150 may then reconstruction a disparity mapping operator from $\phi_\nabla$ using gradient domain processing techniques.

In one embodiment, the application 150 may edit a disparity velocity of the stereo video 152 using a temporal operator. The temporal operator may be used to perform temporal interpolation or smoothing between different disparity ranges at scene transitions. The temporal operator may be defined by a weighted interpolation of two or more of the previously introduced operators (e.g., linear operator, non-linear operator, gradient domain operator), e.g.:

$$\phi_t(d, t) = \sum_i w_i(t)\phi_i(d), \quad \text{(Equation 6)}$$

where $w(t)$ is a weighting function. Consequently, the edited stereo video may have a smoother stereoscopic transition between scenes.

As described above, the application 150 may edit the stereo video 152 stereoscopically based on aspects of disparity and using corresponding disparity mapping operators. In one embodiment, the application 150 may implement the disparity mapping operators using non-linear functions (e.g., stereoscopic warping). For example, the application 150 may compute a set F of sparse feature correspondences $(x, x')$ between the left and right view of a stereo image pair $(I_l, I_r)$. The application 150 may then compute an image- and disparity-based saliency map S, which specifies the visual importance of each pixel in the spatial domain and in the depth domain. The application 150 may further compute a stereoscopic warp of the stereo image pair based on the disparity mapping operators $\phi$, the correspondences F, and the saliency map S, such that the resulting (edited) output views fulfill desired disparity constraints defined by the disparity mapping operators $\phi$. These operations are further discussed below in conjunction with FIG. 3.

In one embodiment, the application 150 may adjust a perceived depth of a scene depicted in the stereo video 152. The application 150 may multiply all disparities in the scene by a constant to grow or shrink the perceived depth window. As a result, the application 150 may adjust the stereoscopic baseline (and/or scene depth of individual objects) in a post-production environment. As used herein, the stereoscopic baseline refers to a line connecting two adjacent viewpoints of an observer. The line represents a displacement between the two adjacent viewpoints of the observer.

In one embodiment, an appropriate stereoscopic baseline can be dependent on the particular scene being depicted. The appropriate stereoscopic baseline can also be dependent on a target viewing environment (e.g., a viewing distance in a home entertainment system). The content producer may use the application 150 to port stereo video from one target platform (such as cinema) to a different target platform (such as the home entertainment system). Further, the content producer (such as a film director) may adjust overall disparity levels of the stereo video 152 to control a depth storyboard of the stereo video 152. Controlling the depth storyboard of the stereo video 152 allows the film director to strike a balance in conveying appropriate depth in the stereo video 152 without causing viewer fatigue.

In one embodiment, the application 150 provides the content producer with artistic control over the local depth content of scenes depicted in the stereo video 152. That is, aside from being used to correct stereographic errors in the stereo video 152, the local depth content can be used as an additional dimension of artistic expression in the stereo video 152. Further, in one embodiment, the application 150 may be integrated into a home entertainment system. For example, a viewer may use the application 150 to adjust the degree of depth perception in the stereo video 152 to a level that the viewer finds most comfortable.

In one embodiment, using the application 150, the content producer may more efficiently stereoscopically edit the stereo video 152 than using image-based view interpolation. Image-based view interpolation requires dense per-pixel depth information and calibrated cameras. Further, image-based view interpolation projects an image/depth pair into 3D world coordinates. Further still, image-based view interpolation re-projects all image pixels into a new viewpoint.

While image-based view interpolation may produce content that is physically accurate, image-based view interpolation may be impractical for large-scale stereo disparity editing. For example, image-based view interpolation requires a known per-pixel depth. Dense depth estimates may be computed using additional information such as structured light to increase the strength of correspondences. In real world setups, however, it may not always be possible to compute such dense depth estimates. For example, the content producer may lack a passive stereo technique that the content producer can rely on for accurate dense depth information. Consequently, the content producer may need to manually refine initial depth maps prior to applying image-based view interpolation techniques. However, such manual refinement requires sub-pixel accuracy. Further, in regions on pixel boundaries, even with perfect information, sub-pixel contributions of the foreground and background objects may cause artifacts around the objects after re-projection.

Further, image-based view interpolation often requires filling information that may become dis-occluded in the new viewpoint. While inpainting techniques may be used to fill the information, inpainting techniques may also rely heavily on manual artist input. Further, because of the dense nature of the projection, pixel-accurate rotoscoping may be required to select objects. Consequently, image-based view interpolation may seldom entail convenient or efficient manual editing. Further, image-based view interpolation often requires pre-calibrating cameras, which can be a costly and time-consuming process. Pre-calibrating cameras may also entail costly fixed-mount camera systems.

Other approaches may not explicitly require view interpolation. For example, some other approaches use a dense optical flow instead of per-pixel depth information. However, the dense optical flow between views corresponds to the information that is used in computing depth maps.

In one embodiment, instead of requiring per-pixel depth information or a dense optical flow, the application 150 uses sparse disparity correspondences that may be much more efficiently computed from the stereo video 152. Further, the application 150 may also avoid inpainting unknown regions and calibrating camera parameters. The application 150 may sacrifice physical accuracy in some cases. However, the application 150 may apply the warp functions 158 to hide physically incorrect distortions in less salient portions of the scene where a user is less likely to notice the physically incorrect distortions. For example, the application 150 may shift content of a scene without creating visible artifacts in the scene. For practical purposes, the application 150 may generate stereo image pairs that, to the viewer, are visually indistinguishable from stereo image pairs generated from physically-correct, depth-based manual editing.

In one embodiment, the application 150 determines sparse disparity correspondences between two images ($I_l$, $I_r$) using techniques for correspondence matching. Alternatively, the application 150 may exploit downsampled dense correspondence information between $I_l$ and $I_r$ for large, textureless image regions that may be too ambiguous for sparse feature matching. The resulting feature set F may have an irregularly clustered distribution of correspondences. Further, some features may not temporally stable over a video sequence of a given length. Instead, the features may disappear only after a small number of frames. Because the application 150 may require only a sparse set of features, the application 150 may use a spatially anisoptropic pruning algorithm to the feature set F. The pruning algorithm may favor temporally stable correspondences and may be adaptive to depth discontinuities. The application 150 may sort correspondences first by lifetime—i.e., long-living pairs receive a higher priority while short-lived pairs receive a lower priority. The application 150 may then apply a greedy procedure to remove lower-priority correspondences around higher-priority correspondences. Let $(x_l, x_r) \in F$ be a high priority correspondence pair with disparity $d(x_l)$. The pruning algorithm may remove all pairs $(x'_l, x'_r) \in F$ with an isotropic distance measure defined by:

$$\left\| \begin{pmatrix} x_l \\ d(x_l) \end{pmatrix} - \begin{pmatrix} x'_l \\ d(x'_l) \end{pmatrix} \right\| < r. \qquad \text{(Equation 7)}$$

The isotropic distance measure in image and disparity space results in a locally adaptive anisotropic filter in image space. The radius r may depend on the image resolution and the disparity range. The value of r=10 has proven useful in some cases. The application 150 may use a warping algorithm that is insensitive to the value of r. Advantageously, the application 150 may compute a sparse but sufficiently accurate set F of correspondences between stereo image pairs.

In one embodiment, the application 150 computes a saliency map S for a stereo image pair. The application 150 may use image-based measures of saliency that capture the coarse- and fine-scale image details, such as prevalent edges or textured regions. Further, the application 150 may exploit a depth dimension (e.g., the sparse disparity information from previously computed stereo correspondences) as an additional source of information for determining saliency. The application may compute a composite saliency map as a weighted combination using a weighting value λ:

$$S(x) = \lambda S_i(x) + (1-\lambda) S_d(x), \qquad \text{(Equation 8)}$$

for all pixels x∈$I_l$, where $S_i$ represents image-based saliency and where $S_d$ represents disparity-based saliency. The application 150 may generate $S_i$ from the local edge map for each stereo channel individually. The application 150 may also use spectral residual (SR) techniques (e.g., based on the amplitude spectrum of a Fourier transform) and/or techniques based on the phase spectrum of the Fourier transform (PFT) to generate $S_i$.

In one embodiment, the application 150 computes the disparity saliency map $S_d$ by any operator on the range of disparities of correspondences in F. Assume that foreground objects generally catch visual attention more than the background of a scene, which is a reasonable assumption for many application scenarios. For a correspondence set F that includes a disparity range $\Omega=[d_{min}, d_{max}]$, the application 150 may assign higher saliency values to disparities close to $d_{min}$ and lower saliency values to disparities close to $d_{max}$. The application 150 may then interpolate saliency values over non-feature pixels in the images.

Figure 1C:
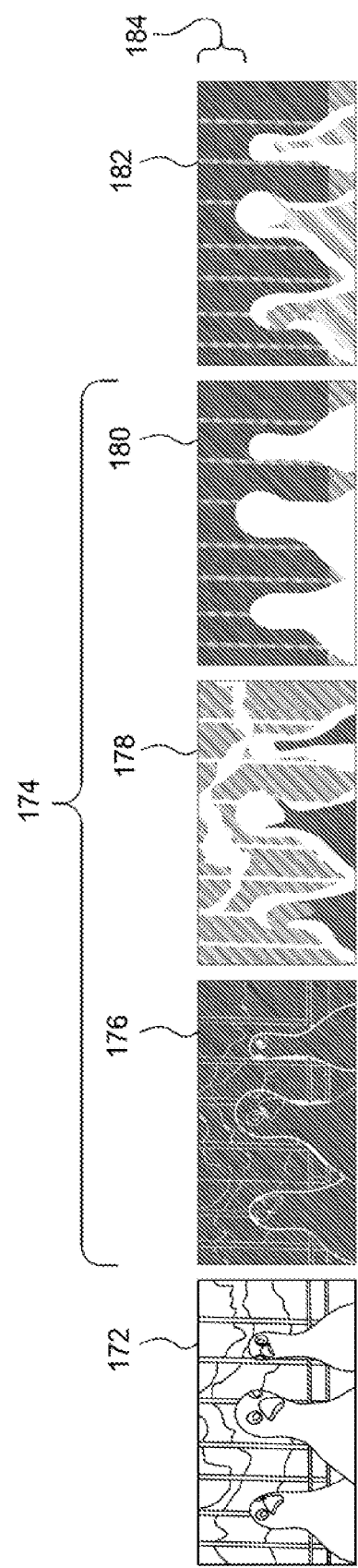
FIG. 1C illustrates components of a saliency map generated for a scene, according to one embodiment of the invention.

FIG. 1C illustrates components 174 of a saliency map 182 generated for a scene, according to one embodiment of the invention. The scene is represented by a left image 172 of a stereo image pair. The components 174 include a local edge saliency component 176, a global texture saliency component 178, and a disparity-based saliency component 180. The application may generate a combined saliency map S (i.e., saliency map 182) based on the components 174. Dark areas 184 in the saliency map 182 may correspond to parts of the scene more likely to be distorted by a warp to accommodate movement within the images. For weighting $S_i$ and $S_d$, a value of $\lambda=0.5$ has proven useful in some cases.

As described above, the application 150 may implement the disparity mapping operators using stereoscopic warping. That is, the application 150 may warp a stereo image pair ($I_l$, $I_r$) such that the range of disparities of the stereo correspondences F is mapped to a new range defined by a disparity mapping operator $\phi:\Omega \to \Omega'$. To do so, the application 150 may compute a pair of warp functions ($w_l$, $w_r$) that map coordinates from the stereo image pair ($I_l$, $I_r$) to a pair of output images ($O_l$, $O_r$), respectively. That is, $O_l \circ w_l = I_l$ and $O_r \circ w_r = I_r$, subject to $d(O_l, O_r) = \phi(d(I_l, I_r))$. In some cases, the application 150 may warp only one image of the stereo image pair. However, distributing deformation to both images of the stereo image pair may increase flexibility in applying disparity mapping operations and decrease visual artifacts. To compute the warp functions, the application 150 may use techniques from video retargeting. For example, the application 150 may define a set of constraints on the warp functions ($w_l$, $w_r$) which may then be solved as a nonlinear least-squares energy minimization problem. The set of constraints may include stereoscopic constraints, temporal constraints, and saliency constraints.

In one embodiment, the stereoscopic constraints apply the disparity mapping operator $\phi$ to the stereo correspondences ($x_l$, $x_r$)∈F. For each correspondence pair, the application 150 may require the disparity of a warped correspondence pair ($w_l(x_l)$, $w_r(x_r)$) to be identical to applying the disparity mapping operator $\phi$ to the original disparity $d(x_l)$. Because the above constraints only prescribe relative positions, the application 150 may also require a set of absolute position constraints that fix the global location of the warped images. The application 150 may compute these position constraints for the twenty percent temporally most stable feature correspondences—i.e., those features that have been detected throughout a sequence of frames in the video. The warped positions may be defined by average previous position and novel disparity, as follows:

$$w_l(x_l) = \frac{x_l + x_r}{2} + \frac{\phi(d(x_l))}{2}, \quad \text{(Equation 9)}$$

$$w_r(x_r) = \frac{x_l + x_r}{2} + \frac{\phi(d(x_r))}{2}.$$

That is, Equation 9 defines a stereoscopic warp constraint such that the disparities of the warped images match the target disparity range $\Omega'$.

In one embodiment, the temporal constraints facilitate properly transferring constraints local image distortion along a local motion direction between successive video frames. The application 150 may measure the local image distortion based on derivatives of the warp. Let $$\frac{\partial w_x^t}{\partial x}$$

denote the partial derivative of the x-component of the warp $w^t$ at time t, and let $f(x_{t-1})$ be the optical flow vector of a pixel $x_{t-1}$ in $I_{t-1}$ to the next frame $I_t$. The corresponding transfer of the warp distortion may be achieved by the following constraint:

$$\frac{\partial w_x^t}{\partial x}(x_t) = \frac{\partial w_x^{t-1}}{\partial x}(x_{t-1} + f(x_{t-1})). \quad \text{(Equation 10)}$$

The above constraint may be enforced for the y-component $$\frac{\partial w_y^t}{\partial y}$$

as well and performed for the left and right image warps independently.

In one embodiment, the saliency constraints reduce visual distortion in the warped images (e.g., as perceived by a viewer). The saliency constraints may enforce a specified rigidity of the warp in salient regions of the image while allowing larger image distortions in less-salient regions of the image. The constraints may include:

Distortions:

$$\frac{\partial w_x}{\partial x} = \frac{\partial w_y}{\partial y} = 1, \quad \text{(Equation 11)}$$

Blending of edges:

$$\frac{\partial w_x}{\partial y} = \frac{\partial w_y}{\partial x} = 0, \quad \text{(Equation 12)}$$

Overlaps:

$$\frac{\partial w_x}{\partial x} \wedge \frac{\partial w_y}{\partial y} > 0. \quad \text{(Equation 13)}$$

During computation of the warp, the application may weigh these constraints by the saliency map S of Equation 8 to adapt the warp to the image content.

In one embodiment, the application 150 may implement the warping constraints (e.g., stereoscopic constraints, temporal constraints, and saliency constraints) using image-based warping techniques. For example the application 150 may convert the constraints into energy terms to solve for the warps ($w_l, w_r$) as an iterative nonlinear least-squares problem. The application 150 may sum all energy terms and weight the saliency constraints by multiplying with the saliency map S. In other embodiments, a user may guide image warping via input provided to the application 150 (e.g., input specifying constraints regarding region positions or global lines).

In one embodiment, by using the warp functions 158 rather than other techniques such as a homography warp or linear combinations of images, the application 150 permits locally varying warping (i.e., to warp objects at different depth levels). Further, the application 150 permits applying different local warping constraints to individual objects.

In one embodiment, the warp functions 158 may be non-linear. The application 150 may apply the non-linear warp functions to a stereo image pair to generate a new virtual viewpoint. Conceptually, the application 150 places a regular grid over an image and computes new grid coordinates to minimize predefined criteria. The application 150 may warp the image to fit the new grid coordinates.

Figure 2:
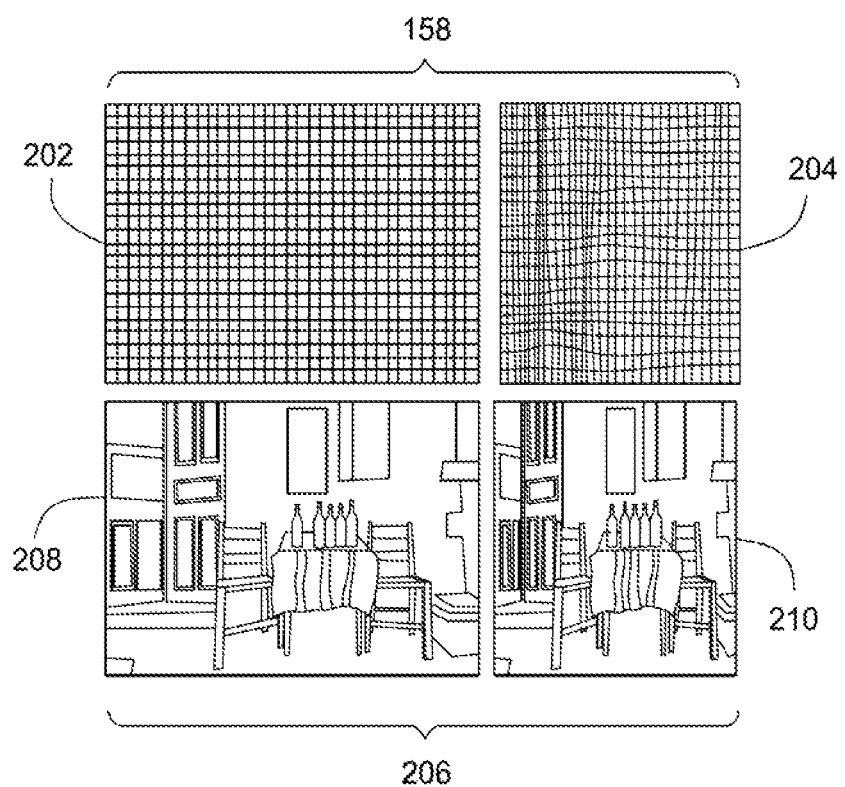
FIG. 2 illustrates a non-linear warp function being applied to a first image, according to one embodiment of the invention.

FIG. 2 illustrates the non-linear warp function 158 being applied to an image 206, according to one embodiment of the invention. In one embodiment, the warp function for a given image (frame) of the stereo video 152 specifies how the shape of each pixel of the image 206 is deformed. The warp function may specify a mapping between a first grid 202 of pixel positions to a second grid 204 of pixel positions. The application 150 may apply the warp function to the image 206 to generate a modified image 210. In one embodiment, the modified image 210 corresponds to a frame of the stereoscopically modified stereo video 160.

In one embodiment, rather than constraining the new grid with a new aspect ratio and/or image size, the application 150 may maintain the image size and satisfy a sparse series of constraints that enforces a specific disparity at specific pixels. These disparity constraints may be counterbalanced by a saliency property for preserving salient parts of the image. Consequently, areas of the image less noticeable to the viewer may be distorted more by the application 150. The resulting images may be physically inaccurate. However, the resulting images may look plausible (and/or more aesthetically pleasing) to the viewer. Advantageously, the application 150 may produce a dense resulting image having no holes, without requiring dense disparity information having per-pixel depth (which may often be very difficult to compute). Further, the application 150 may also determine and apply a non-linear warp function for both (i) stereoscopically warping and (ii) retargeting (i.e., to a new aspect ratio) the stereo video 152. That is, the application 150 may perform both stereoscopic warping and retargeting at the same time. For example, the application 150 may convert a cinema movie having a 2.39:1 aspect ratio into a movie suited for a widescreen display (e.g., having a 16:9 aspect ratio). That is, the converted movie not only is retargeted for the widescreen display but also includes a depth impression suited to the widescreen display.

When displaying an image on a flat surface, it may not be possible to faithfully reproduce certain depth cues, such as accommodation. Accommodation refers to a change in a focal length of a lens of an eye. Accommodation brings objects at different distances into focus. Accordingly, when displaying a close object on a distant screen, a strong negative disparity may result in an uncomfortable viewing experience and can cause temporary diplopia, the inability to fuse stereoscopic images. In one embodiment, the application 150 may stereoscopically modify the stereo video 152 to correct the strong negative disparity. Further, those of skill in the art will appreciate that the application 150 may stereoscopically modify the stereo video 152 in other environments. For example, content optimized for a standard 30-foot cinema screen may appear different on a TV screen or a handheld display. In one embodiment, the application 150 may stereoscopically modify the stereo video 152 to suit the stereo video 152 for display on the TV screen (or handheld display). Furthermore, individual viewers can have vastly different viewing preferences or even deficiencies in stereoscopic perception. In one embodiment, a viewer may use the application 150 to stereoscopically adjust the stereo video 152 to the liking of the viewer.

Figure 3:
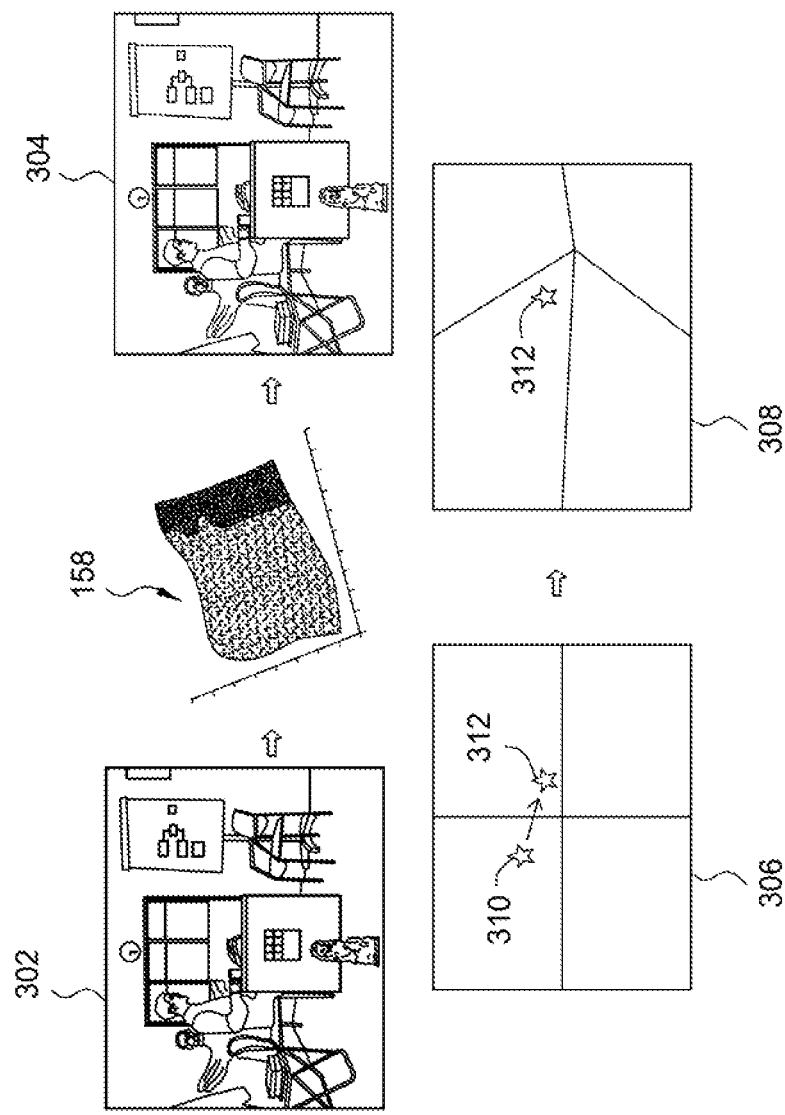
FIG. 3 illustrates the non-linear warp function being applied to a second image, according to one embodiment of the invention.

FIG. 3 illustrates the non-linear warp function 158 being applied to an image 302, according to one embodiment of the invention. The image 302 may correspond to a frame of the stereo video 152 of FIG. 1A. In one embodiment, the application 150 applies the non-linear warp function 158 to the image 302 to generate the modified image 304. The modified image 304 may correspond to a frame of the stereoscopically modified stereo video 160. Grids 306, 308 represent how scene elements are arranged in the images 302 and 304, respectively. The grid 306 for the image 302 includes a symbol 310 representing a salient portion of the image 302. The symbol is moved to a new location 312 in the grid 308 for the image 304.

Figure 4:
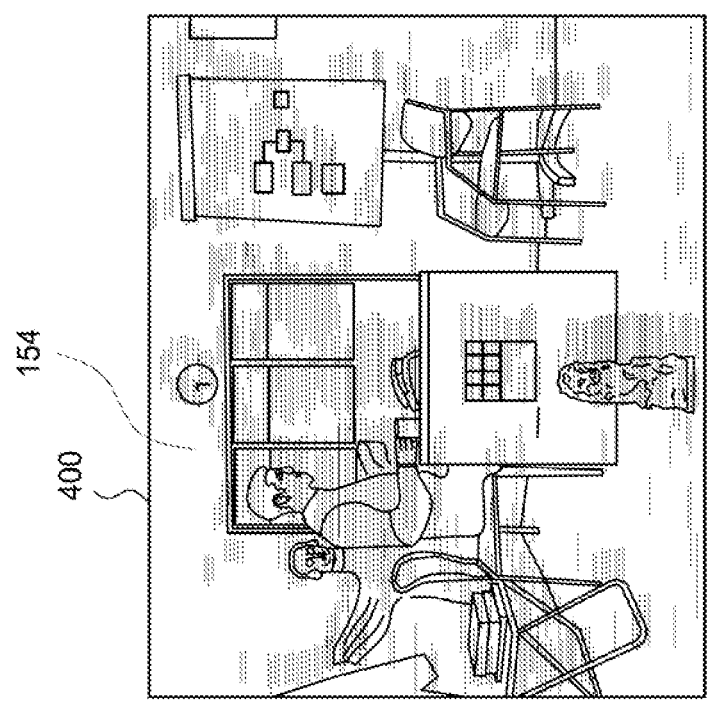
FIG. 4 depicts an image illustrating disparities determined by an application for stereoscopically modifying a sequence of image pairs, according to one embodiment of the invention.

In one embodiment, the application 150 operates in disparity space to obtain 3D scene information for generating the new virtual viewpoint. Consequently, the application 150 need not require camera calibrations as an input. The application 150 may rectify each stereo image pair such that all features depicted in the respective stereo image pair lie on horizontal scan-lines. Doing so removes the divergence from the stereo image pair. The application 150 may compute disparities 154 at sparse pixels in the stereo image pair. Because the application 150 only computes disparities 154 for points having strong local features, the disparities 154 at sparse pixels may be generated more efficiently than dense disparity information. In one embodiment, the application 150 may compute a sparse disparity matching between left and right cameras using a Lucas-Kanade feature matching method. FIG. 4 depicts an image 400 illustrating disparities 154 determined by the application 150, according to one embodiment of the invention. In one embodiment, the application 150 may determine the disparities 154 at sparse pixels of a stereo image pair for the image 400.

In one embodiment, after computing sparse disparities 154 in the stereo video, the application 150 may provide disparity constraints. The disparity constraints enforce a specific disparity at each pixel in the sparse set. For example, if the content producer desires to reduce all disparities in the image by a factor of 0.5, the application 150 may compute new pixel positions for the sparse constraints that occur halfway between the original points in the original stereo image pair. In doing so, the application 150 correctly accounts for 3D scene knowledge, because points lying closer to the camera (and that involve a larger disparity) are moved at a greater extent than points lying farther from the camera. In one embodiment, the application 150 may reduce all disparities by a constant factor based on predefined stereographic techniques. Alternatively, a content producer (such as an artist) may locally control the disparity constraints via the application 150.

In one embodiment, the resulting image produced by the application 150 may contain visible artifacts in regions that have been stretched to fit the new grid coordinates. In one embodiment, to improve visual consistency between the resulting image and the source image, the application 150 may compute a saliency map for the source image. The saliency map specifies salient portions 156 of the source image. FIG. 5 illustrates salient portions 156 of an image 500 as determined by the application 150, according to one embodiment of the invention. As shown, the salient portions 156 include edges in the scene. The application 150 may use the salient portions 156 to enforce smoothness in the resulting grid, weighted by the saliency of each grid quad. Consequently, the application 150 may distort regions having lower saliency to a greater extent than regions having higher saliency, based on the saliency map.

In one embodiment, after providing the disparities 154 and/or the salient portions 156, the application 150 may compute the warp functions 158 based on the disparities 154 and/or the salient portions 156. For example, the application 150 can solve for warped grid positions using a system of linear equations. In one embodiment, the warped grid positions may be solved for more efficiently on the GPU rather than on the CPU, while enforcing several nonlinear constraints. The application 150 may iteratively solve the least squares system but enforce that grid cells cannot self-intersect. Consequently, the application 150 may compute a nonlinear solution for the warped grid positions.

In one embodiment, the application 150 may be applied to a variety of areas such as porting stereo video to specific platforms, correcting stereographic errors, manual depth storyboard editing, local manual disparity editing, generating stereo (3D) video from non-stereo (2D) video, adjusting stereo video for viewer comfort, and so forth.

As described above, in one embodiment, the application 150 may be applied in the area of porting stereo video to specific platforms. The perception of depth by a viewer in viewing a stereo video depends on several factors. The factors may include the size of the display screen, the viewing distance (i.e., the distance between the viewer and the display screen), and the stereoscopic baseline between the cameras used for filming (or imaging) the stereo video. Filming with stereo cameras may often entail precise tweaking of the stereoscopic baseline. The content producer (such as a director) may need to consider the intended viewing distance, the distance to subject being filmed, and the desired stereoscopic effect. To reproduce realistic depth effects, the director may use the equation:

$$D_{screen}/B_{eyes} = D_{subject}/B_{filming} \quad \text{(Equation 14)}$$

where $D_{screen}$ is the known viewing distance, $B_{eyes}$ is the mean human interpupillary distance (63 millimeters), $D_{subject}$ is the distance to the subject being filmed, and $B_{filming}$ is the stereoscopic baseline used for filming. Further, this equation may be tailored to suit the needs of a particular case (for example, where the desired baseline may be different). For instance, an exaggerated stereo effect is often desirable in landscape scenes. In such landscape scenes, the director may use a much wider baseline than would be used to achieve a realistic looking depth effect.

In one embodiment, according to Equation 14, when $D_{screen}$ changes size, a new $B_{filming}$ is required. When the viewer is in a cinema, the viewer remains relatively stationary and at a controlled distance of a display screen of known size. However, stereo displays are also produced nowadays for home viewing and are even being incorporated onto cell-phone devices. Although a director may select an appropriate stereoscopic baseline for each scene of a stereo video for cinema viewing, the perceived depth changes upon rescaling the video for a target platform other than cinema. In one embodiment, the director may use the application 150 to adjust the perceived depth of the stereo video so that the stereo video may be properly viewed on another target platform. The perceived depth may need to be further adjusted to maintain the perceived depth in certain environments. An example of such an environment includes head mounted displays, where depth is viewed as compressed, even when accounting for a correct viewing angle.

As described above, in one embodiment, the application 150 may be applied in the area of correcting stereographic errors. The content producer often budgets disparity in stereo videos. Too much disparity may cause viewer fatigue. Further, a disparity that varies greatly from scene to scene may make it difficult for the viewer to converge stereo image pairs. In one embodiment, the content producer may define stereography rules that limit disparity to an acceptable range. The application 150 may generate the stereoscopically modified stereo video 160 based on the stereography rules. Such stereography rules may be used in live filming environments such as sporting events, where manual intervention is often difficult and where cameramen can seldom capture stereoscopic video that meets an acceptable quality. Advantageously, stereo filming may be greatly simplified by correcting stereographic errors in post-production environments.

FIG. 6 illustrates a graph 600 representing a disparity storyboard of a stereo movie trailer, according to one embodiment of the invention. The graph 600 is plotted against a y-axis 602 representing disparity (in pixels) computed by the application 150 for scenes of the stereo movie trailer. The graph 600 is also plotted against an x-axis 604 representing time. The graph 600 includes shading 606 that represents the number of sparse pixels supporting the disparity. A lighter shading represents a greater number of sparse pixels supporting a given disparity.

As described above, in one embodiment, the application 150 may be applied in the area of manual depth storyboard editing. To improve the experience of viewing the stereo video, the viewer may desire to view the stereo video in a display environment that closely resembles the target platform of the stereo video. However, it may not always be practical for the viewer to view the stereo video in such a display environment. Accordingly, the content producer may use the application 150 to edit the depth storyboard of the stereo video so that the viewer may properly view the stereo video.

As described above, in one embodiment, the application 150 may be applied in the area of local manual disparity editing. Content producers (such as artists) may use the application 150 to edit disparity conveniently in stereo video. For example, the artist may select a region of sparse disparity points and drag the region to create a local warping that creates different disparities for different regions. This technique may be used for generating stereo video from non-stereo video and for controlling of object disparities to achieve desired artistic effects. Further, the artist may edit saliency information computed by the application 150 to specify that certain important features in a scene remain constant in the warped image.

Figure 7:
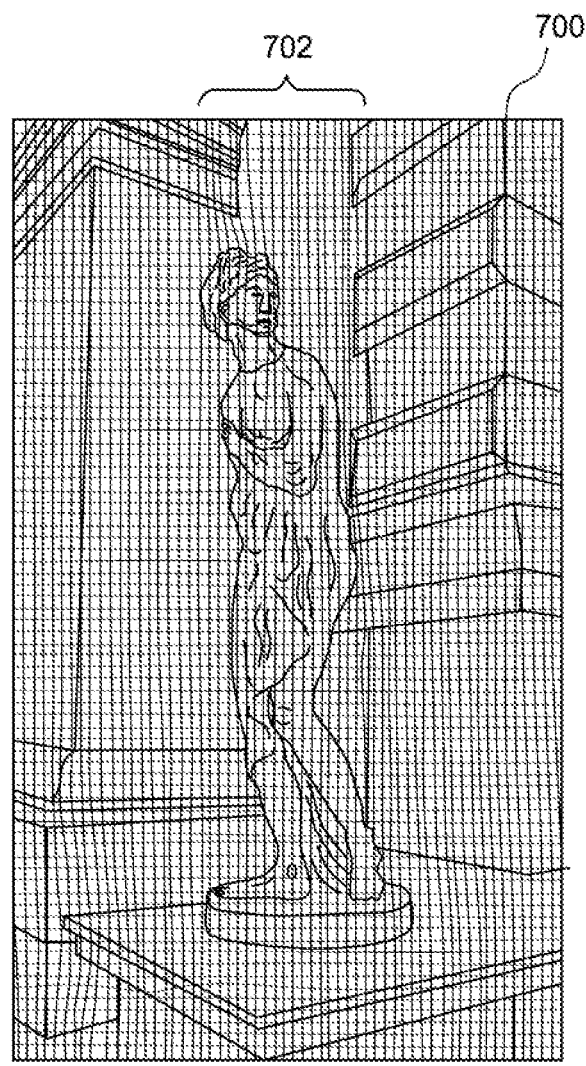
FIG. 7 illustrates an image that has a new viewpoint and that is generated by the application, according to one embodiment of the invention.

FIG. 7 illustrates an image 700 that has a new viewpoint and that is generated by the application 150, according to one embodiment of the invention. The image 700 may correspond to a frame of the stereoscopically modified stereo video 160. The image 700 depicts a statue 702 that is moved to a greater extent than the background of the image 700. Further, the application may, at least to some degree, hide warping from the viewer in areas of the image 700 that have fewer features.

As described above, in one embodiment, the application 150 may be applied in the area of generating stereo (3D) video from non-stereo (2D) video. For example, the application 150 may be applied in animated videos. Because painted scenes in animated videos often do not correspond to a real, possible 3D configuration, applying real physical projection to the animated videos may lead to incorrect stereoscopic results. Instead, the application 150 may stereoscopically edit the animated video to introduce appropriate stereoscopic properties in the animated video.

As described above, in one embodiment, the application 150 may be applied in the area of adjusting stereo video for viewer comfort. Sometimes, the viewer may experience headaches from focusing on one plane while converging eyes on a different plane. The human interpupillary distance may vary from forty-five millimeters to eighty millimeters. Depth perception may vary more greatly between subjects being filmed than between viewing conditions. Advantageously, by using the application 150, the viewer may interactively control the stereoscopic baseline of the stereo video to suit the preferences of the viewer based on the home entertainment system configuration of the viewer.

Figure 8:
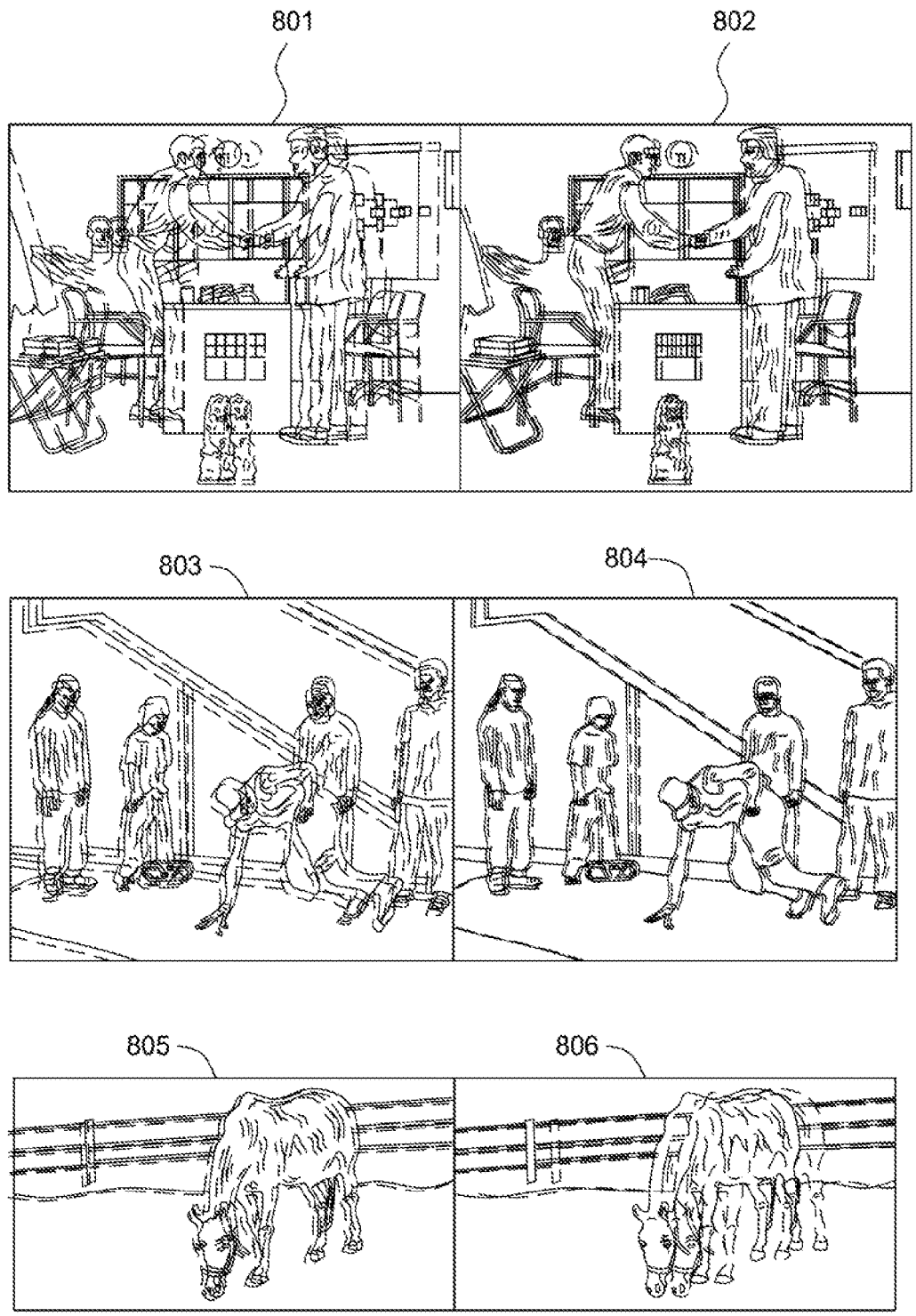
FIG. 8 illustrates anaglyph images representing stereo image pairs before and after stereoscopic editing using the application, according to one embodiment of the invention.

FIG. 8 illustrates anaglyph images 801-806 representing stereo image pairs before and after stereoscopic editing using the application 150, according to one embodiment of the invention. The anaglyph image 801 depicts a handshaking scene prior to stereoscopic editing. The anaglyph image 802 depicts the handshaking scene subsequent to stereoscopic editing. As shown in the anaglyph image 802, the stereoscopic baseline of the handshaking scene depicted in the anaglyph image 801 has been adjusted by the application 150. Similarly, the anaglyph image 802 depicts a breakdancing scene prior to stereoscopic editing. The anaglyph image 804 depicts the breakdancing scene subsequent to stereoscopic editing. As shown in the anaglyph image 804, the stereoscopic baseline of the breakdancing scene depicted in the anaglyph image 803 has been adjusted by the application 150. Further, the anaglyph image 805 depicts a scene of a horse grazing and prior to stereoscopic editing. The anaglyph image 806 depicts the scene of the horse grazing and subsequent to stereoscopic editing. As shown in the anaglyph image 806, the stereoscopic baseline of the scene of the horse grazing depicted in the anaglyph image 805 has been adjusted by the application 150.

Figure 9:
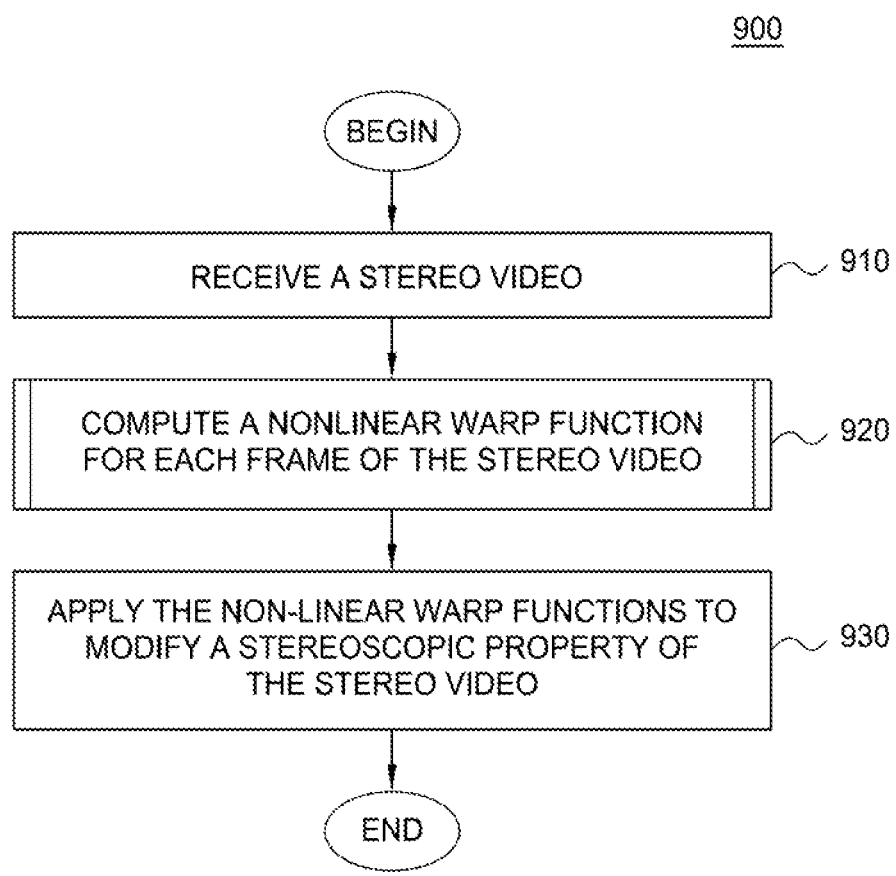
FIG. 9 is a flowchart depicting a method for stereoscopically editing the stereo video, according to one embodiment of the invention.

FIG. 9 is a flowchart depicting a method 900 for stereoscopically editing the stereo video 152 of FIG. 1A, according to one embodiment of the invention. As shown, the method 900 begins at step 910, where the application 150 receives the stereo video 152. At step 920, the application 150 computes a non-linear warp function for each frame of the stereo video 152. For each image pair, the application 150 may compute a non-linear warp function for each image of the respective image pair. The application 150 may then apply the non-linear warp functions to the respective image to generate a modified image pair. In an alternative embodiment, the application only modifies one of the images for some image pairs. In such cases, the modified image pair includes a modified first image and an original second image. The step 920 is further discussed below in conjunction with FIG. 10.

At step 930, the application 150 applies the non-linear warp functions to modify a stereoscopic property of the stereo video 152. For example, a stereoscopic disparity of the stereo video 152 may be modified. Further, a local depth composition of a scene element of the stereo video 152 may be modified. As a result, the application 150 generates the stereoscopically modified stereo video 160. After the step 930, the method 900 terminates.

Figure 10:
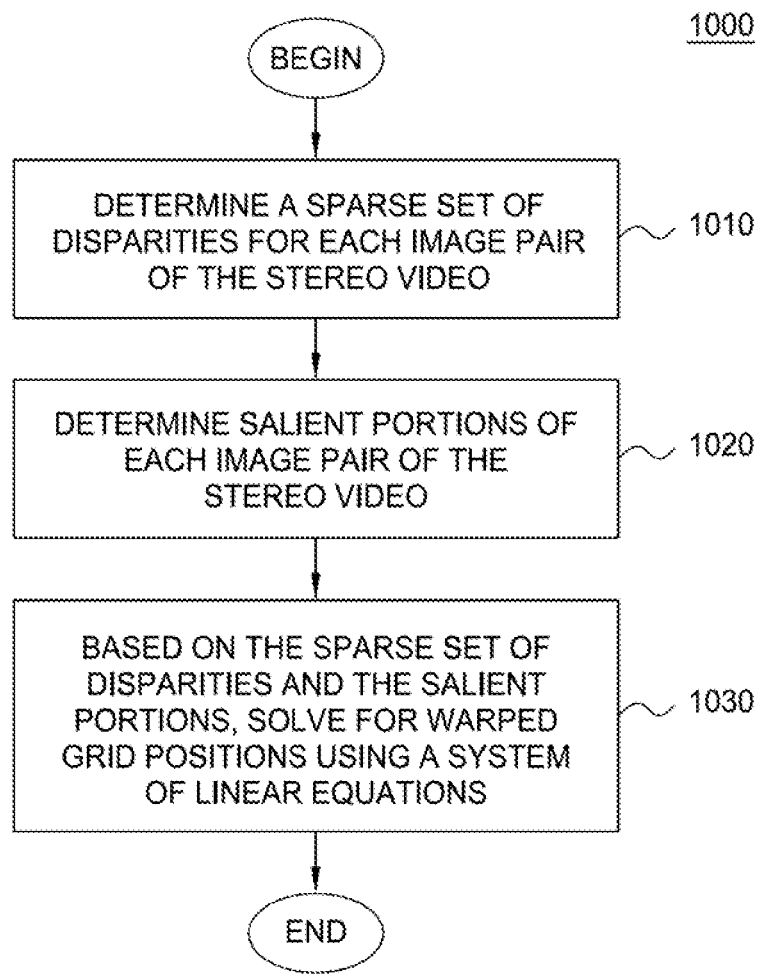
FIG. 10 is a flowchart depicting a method for computing the non-linear warp function for each frame of the stereo video, according to one embodiment of the invention.

FIG. 10 is a flowchart depicting a method 1000 for computing the non-linear warp function for each frame of the stereo video 152 of FIG. 1A, according to one embodiment of the invention. The method 1000 corresponds to the step 920 of FIG. 9. As shown, the method 1000 begins at step 1010, where the application 150 determines a sparse set of disparities 154 for each image pair of the stereo video 152. At step 1020, the application 150 determines salient portions 156 of each image pair of the stereo video 152. At step 1030, the application 150 solves for warped grid positions using a system of linear equations and based on the sparse set of disparities 154 and the salient portions 156. The application 150 may define the non-linear warp functions on the basis of the warped grid positions. After the step 1030, the method 1000 terminates.

Figure 11:
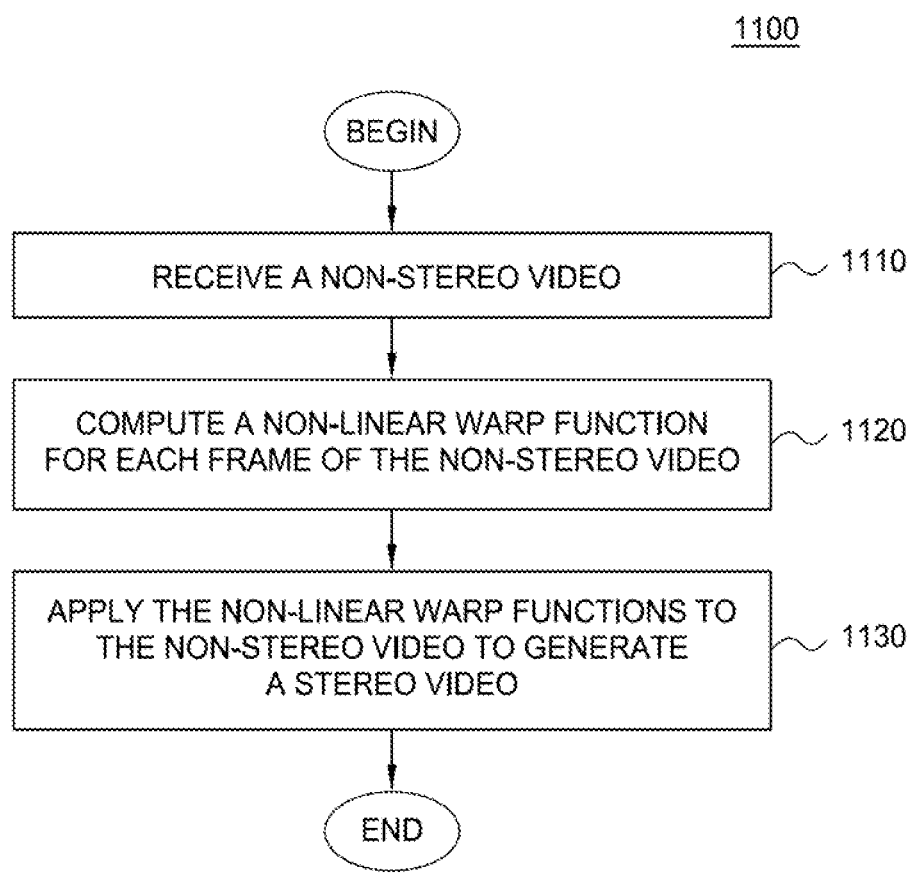
FIG. 11 is a flowchart depicting a method for stereoscopically editing a non-stereo video, according to one embodiment of the invention.

FIG. 11 is a flowchart depicting a method 1100 for stereoscopically editing a non-stereo video, according to one embodiment of the invention. As shown, the method 1100 begins at step 1110, where the application 150 receives a non-stereo video. At step 1120, the application 150 computes a non-linear warp function for each frame of the non-stereo video. For example, the application 150 may compute the non-linear warp functions based on salient portions of the frames of the non-stereo video (e.g., as specified by user input). At step 1130, the application 150 applies the non-linear warp functions to the non-stereo video to generate a modified non-stereo video. The application 150 may combine the non-stereo video and the modified non-stereo video to form a stereo video. In an alternative embodiment, the application 150 may compute a second set of non-linear warp functions for each frame of the non-stereo video to generate a second modified non-stereo video. The application 150 may then combine the modified non-stereo video and the second modified non-stereo video to form a stereo video. After the step 1130, the method 1100 terminates.

Advantageously, embodiments of the invention provide techniques for stereoscopically editing video content. The content producer may use these techniques to edit stereoscopic properties of the video content more conveniently and efficiently. For example, the video content may be stereoscopically edited in a post-production environment. Consequently, the content producer may greatly reduce the costs of creating stereo videos. The content producer may also correct stereographic errors more efficiently. Further, the content producer may port stereo video content to other display devices more efficiently. The content producer may also generate stereo video from non-stereo video more efficiently. Further still, the content producer may obtain artistic control over the perceived depth composition of scenes depicted in the stereo video. The techniques disclosed herein may be readily applicable to existing video content and may greatly reduce the costs associated with both filming and editing stereo video footage.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method, comprising:
   providing at least one video frame, each video frame comprising at least two stereo images and having a stereoscopic property characterizing a stereoscopic relationship between the at least two stereo images of the respective video frame; and stereoscopically modifying a video frame by altering at least a first of the stereo images of the video frame using at least one mapping function and by operation of one or more computer processors, wherein the first stereo image has a first set of pixels and a second set of pixels;

wherein the at least one mapping function comprises a non-linear warp function configured to warp the first set of pixels to a greater extent than the second set of pixels, in mapping from the stereoscopically unmodified first stereo image to the stereoscopically modified first stereo image, thereby modifying the stereoscopic property of the video frame.

2. The computer-implemented method of claim 1, wherein altering at least a first stereo image of the video frame comprises:

computing the at least one mapping function based on a visual characteristic of the video frame; and applying the computed at least one mapping function to the first stereo image of the video frame.

3. The computer-implemented method of claim 2, wherein the visual characteristic of the video frame specifies one or more salient portions of the video frame, and wherein altering at least a first stereo image of the video frame further comprises:

determining the visual characteristic of the video frame.

4. The computer-implemented method of claim 3, wherein the visual characteristic is determined from imaged-based saliency and disparity-based saliency of the at least one video frame.

5. The computer-implemented method of claim 1, wherein altering at least a first stereo image of the video frame comprises:

determining a set of disparities of the video frame;

computing the at least one mapping function based on the set of disparities of the video frame; and applying the computed at least one mapping function to the first stereo image of the video frame.

6. The computer-implemented method of claim 1, wherein the provided at least one video frame is generated from at least one monoscopic video frame.

7. A non-transitory computer-readable medium containing a program which, when executed, performs an operation comprising:

providing at least one video frame, each video frame comprising at least two stereo images and having a stereoscopic property characterizing a stereoscopic relationship between the at least two stereo images of the respective video frame; and stereoscopically modifying a video frame by altering at least a first of the stereo images of the video frame using at least one mapping function and by operation of one or more computer processors when executing the program, wherein the first stereo image has a first set of pixels and a second set of pixels;

wherein the at least one mapping function comprises a non-linear warp function configured to warp the first set of pixels to a greater extent than the second set of pixels, in mapping from the stereoscopically unmodified first stereo image to the stereoscopically modified first stereo image, thereby modifying the stereoscopic property of the video frame.

8. The non-transitory computer-readable medium of claim 7, wherein altering at least a first stereo image of the video frame comprises:

computing the at least one mapping function based on a visual characteristic of the video frame; and applying the computed at least one mapping function to the first stereo image of the video frame.

9. The non-transitory computer-readable medium of claim 8, wherein the visual characteristic of the video frame specifies one or more salient portions of the video frame, and wherein altering at least a first stereo image of the video frame further comprises:

determining the visual characteristic of the video frame.

10. The non-transitory computer-readable medium of claim 9, wherein the visual characteristic is determined from imaged-based saliency and disparity-based saliency of the at least one video frame.

11. The non-transitory computer-readable medium of claim 7, wherein altering at least a first stereo image of the video frame comprises:

determining a set of disparities of the video frame;

computing the at least one mapping function based on the set of disparities of the video frame; and applying the computed at least one mapping function to the first stereo image of the video frame.

12. The non-transitory computer-readable medium of claim 7, wherein the provided at least one video frame is generated from at least one monoscopic video frame.

13. A system, comprising:

a computer processor; and a memory containing a program, which when executed by the computer processor is configured to perform an operation comprising:

providing at least one video frame, each video frame comprising at least two stereo images and having a stereoscopic property characterizing a stereoscopic relationship between the at least two stereo images of the respective video frame; and stereoscopically modifying a video frame by altering at least a first of the stereo images of the video frame using at least one mapping function, wherein the first stereo image has a first set of pixels and a second set of pixels;

wherein the at least one mapping function comprises a non-linear warp function configured to warp the first set of pixels to a greater extent than the second set of pixels, in mapping from the stereoscopically unmodified first stereo image to the stereoscopically modified first stereo image, thereby modifying the stereoscopic property of the video frame.

14. The system of claim 13, wherein altering at least a first stereo image of the video frame comprises:

computing the at least one mapping function based on a visual characteristic of the video frame; and applying the computed at least one mapping function to the first stereo image of the video frame.

15. The system of claim 14, wherein the visual characteristic of the video frame specifies one or more salient portions of the video frame, and wherein altering at least a first stereo image of the video frame further comprises:

determining the visual characteristic of the video frame.

16. The system of claim 15, wherein the visual characteristic is determined from imaged-based saliency and disparity-based saliency of the at least one video frame.

17. The system of claim 13, wherein altering at least a first stereo image of the video frame comprises:

determining a set of disparities of the video frame;

computing the at least one mapping function based on the set of disparities of the video frame; and applying the computed at least one mapping function to the first stereo image of the video frame.

18. The system of claim 13, wherein the provided at least one video frame is generated from at least one monoscopic video frame.

19. A computer-implemented method to modify a stereoscopic property of a video frame, the method comprising:
providing at least one video frame including the video frame, each video frame comprising at least two stereo images and having a stereoscopic property characterizing a stereoscopic relationship between the at least two stereo images of the respective video frame; and
stereoscopically modifying the video frame by altering at least a first of the stereo images of the video frame by operation of one or more computer processors and based on at least one predefined aspect of disparity, wherein the first stereo image has a first set of pixels and a second set of pixels;
wherein the first set of pixels is warped to a greater extent than the second set of pixels, when the stereoscopically unmodified first stereo image is mapped to the stereoscopically modified first stereo image by a non-linear warp function, thereby modifying the stereoscopic property of the video frame.

20. The computer-implemented method of claim 19, wherein the at least one predefined aspect of disparity comprises at least one of a disparity range, a disparity sensitivity, a disparity gradient, and a disparity velocity of the video frame.

21. The computer-implemented method of claim 20, wherein the disparity range defines a stereoscopic comfort zone for viewing the at least one video frame.

22. The computer-implemented method of claim 20, wherein the disparity sensitivity specifies a level of ease with which different depths are distinguished in the at least one video frame.

23. The computer-implemented method of claim 20, wherein the disparity gradient is determined from a disparity of a feature depicted in the at least one video frame and an angular separation of the feature.

24. The computer-implemented method of claim 20, wherein the at least one video frame comprises a plurality of video frames, wherein the disparity velocity specifies an extent to which a disparity changes over time in the plurality of video frames.

25. The computer-implemented method of claim 19, wherein at least one predefined aspect of disparity is associated with a corresponding predefined disparity mapping operator.

26. The computer-implemented method of claim 25, wherein the corresponding predefined disparity mapping operator is implemented using at least one mapping function.

27. A computer-implemented method to modify a stereoscopic property of a video frame, the method comprising:
providing at least one video frame including the video frame, each video frame comprising at least two stereo images and having a stereoscopic property characterizing a stereoscopic relationship between the at least two stereo images of the respective video frame; and
stereoscopically modifying the video frame by altering at least a first of the stereo images of the video frame by operation of one or more computer processors and using at least one predefined disparity mapping operator, wherein the first stereo image has a first set of pixels and a second set of pixels;
wherein the first set of pixels is warped to a greater extent than the second set of pixels, when the stereoscopically unmodified first stereo image is mapped to the stereoscopically modified first stereo image by a non-linear warp function, thereby modifying the stereoscopic property of the video frame.

28. The computer-implemented method of claim 27, wherein the disparity mapping operator is selected from at least a linear operator, a non-linear operator, a gradient domain operator, and a temporal operator.

29. The computer-implemented method of claim 28, wherein the linear operator is configured to perform global linear adaptation of a disparity in the at least one video frame to a target range, wherein the non-linear operator is configured to perform non-linear disparity compression in the at least one video frame, wherein the gradient domain operator is configured to remap disparity gradients of the at least one video frame, and wherein the temporal operator is configured to perform temporal smoothing at a scene transition of the at least one video frame.

30. The computer-implemented method of claim 1, wherein the method is to modify the stereoscopic property of the video frame, based on the non-linear warp function, wherein the first and second sets of pixels are distinct sets of pixels, wherein the stereoscopic property is selected from at least one of an interocular distance of the video frame and a local depth composition of a scene element depicted in the video frame, wherein altering at least a first stereo image of the video frame comprises, without requiring user intervention:
determining a set of disparities of the video frame;
computing the at least one mapping function based on the set of disparities of the video frame; and
applying the computed at least one mapping function to the first stereo image of the video frame.

31. The computer-implemented method of claim 30, wherein the visual characteristic of the video frame specifies one or more salient portions of the video frame, wherein the video frame is stereoscopically modified by an image processing application, wherein the image processing application is configured to independently determine each individual visual characteristic selected from:
(i) imaged-based saliency of the at least one video frame; and
(ii) disparity-based saliency of the at least one video frame.

32. The computer-implemented method of claim 31, wherein the provided at least one video frame is generated from at least one monoscopic video frame, wherein the video frame is stereoscopically modified based on at least one predefined aspect of disparity, wherein the image processing application is configured to independently modify the video frame based on each individual aspect of disparity selected from:
(i) a disparity range of the video frame;
(ii) a disparity sensitivity of the video frame;
(iii) a disparity gradient of the video frame; and
(iv) a disparity velocity of the video frame.

33. The computer-implemented method of claim 32, wherein the disparity range defines a stereoscopic comfort zone for viewing the at least one video frame;
wherein the disparity sensitivity specifies a level of ease with which different depths are distinguished in the at least one video frame;
wherein the disparity gradient is determined from a disparity of a feature depicted in the at least one video frame and an angular separation of the feature;

wherein the at least one video frame comprises a plurality of video frames, wherein the disparity velocity specifies an extent to which a disparity changes over time in the plurality of video frames.

34. The computer-implemented method of claim 33, wherein at least one predefined aspect of disparity is associated with a corresponding predefined disparity mapping operator that is implemented using the at least one mapping function, wherein the video frame is stereoscopically modified using at least one predefined disparity mapping operator.

35. The computer-implemented method of claim 34, wherein the image processing application is configured to independently modify the video frame using each individual disparity mapping operator selected from:
  (i) a linear operator configured to perform global linear adaptation of a disparity in the at least one video frame to a target range;
  (ii) a non-linear operator configured to perform non-linear disparity compression in the at least one video frame;
  (iii) a gradient domain operator configured to remap disparity gradients of the at least one video frame; and
  (iv) a temporal operator configured to perform temporal smoothing at a scene transition of the at least one video frame.

36. The computer-implemented method of claim 35, wherein the non-linear disparity compression is performed via a non-linear function on a sum of: (i) a product of: (A) a disparity value of the at least one video frame and (B) a predefined scaling factor; and (ii) a predefined constant; wherein the non-linear function comprises a logarithm;
  wherein a plurality of non-linear functions, including the non-linear function, is used to perform the non-linear disparity compression, each of the plurality of non-linear functions configured to map a respective set of disparity values of the at least one video frame and falling within a respective source disparity range, to a respective target disparity range;
  wherein each of the plurality of non-linear functions is distinct, wherein each set of disparity values of the at least one video frame is distinct, wherein each corresponding target disparity range is distinct;
  wherein the non-linear operator comprises a predefined function including an integral, over a specified interval, over a set of saliency values corresponding to first derivates of the plurality of non-linear functions, wherein the image processing application is configured to independently perform each individual operation selected from: (i) generating the set of saliency values based on user input and (ii) generating the set of saliency values based on the at least one video frame and without requiring any user input.

* * * * *